United States Patent
Kim

(10) Patent No.: US 9,094,577 B2
(45) Date of Patent: Jul. 28, 2015

(54) DIGITAL BROADCAST TRANSMITTER, DIGITAL BROADCAST RECEIVER, AND AUDIO DESCRIPTION DESCRIPTOR PROCESSING METHODS THEREOF

(71) Applicant: SAMSUNG ELECTRONICS CO., LTD., Suwon-si (KR)

(72) Inventor: Moon-ju Kim, Cheonan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 251 days.

(21) Appl. No.: 13/713,170

(22) Filed: Dec. 13, 2012

(65) Prior Publication Data

US 2013/0160071 A1 Jun. 20, 2013

(30) Foreign Application Priority Data

Dec. 20, 2011 (KR) ........................ 10-2011-0138709

(51) Int. Cl.
| | | |
|---|---|---|
| *H04N 7/10* | (2006.01) | |
| *H04N 7/025* | (2006.01) | |
| *H04H 20/47* | (2008.01) | |
| *H04H 20/88* | (2008.01) | |
| *H04H 40/36* | (2008.01) | |
| *H04N 7/173* | (2011.01) | |
| *H04N 21/439* | (2011.01) | |
| *H04N 21/485* | (2011.01) | |
| *H04N 21/81* | (2011.01) | |

(52) U.S. Cl.
CPC ....... *H04N 7/17309* (2013.01); *H04N 21/4396* (2013.01); *H04N 21/4852* (2013.01); *H04N 21/814* (2013.01)

(58) Field of Classification Search
None
See application file for complete search history.

(56) References Cited

U.S. PATENT DOCUMENTS

2003/0093788 A1 5/2003 Takenaka

FOREIGN PATENT DOCUMENTS

| JP | 2001-268463 A | 9/2001 |
|---|---|---|
| KR | 10-2010-0007314 A | 1/2010 |

OTHER PUBLICATIONS

Communication, dated Feb. 14, 2013, issued by the European Patent Office in counterpart European Patent Application No. 12187179.2.
"Digital Video Broadcasting (DVB); Specification for the use of Video and Audio Coding in Broadcasting Applications based on the MPEG-2 Transport Stream," Technical Specification, European Telecommunications Standards Institute, 101 154 V1.10.1, Jun. 1, 2011, pp. 1-168.
Communication dated Sep. 30, 2014, issued by the European Patent Office in counterpart European Application No. 12187179.2.
Communication dated Feb. 20, 2015 issued by the European Patent Office in counterpart European Patent Application No. 12 187 179.2.

*Primary Examiner* — Regina N Holder
(74) *Attorney, Agent, or Firm* — Sughrue Mion, PLLC

(57) ABSTRACT

A digital broadcast receiver is provided. The digital broadcast receiver includes a broadcast reception unit which receives a digital broadcast signal; a signal separation unit which separates a main audio signal, an auxiliary audio signal, and an audio description descriptor from the received digital broadcast signal; an extraction unit which extracts auxiliary information from the audio description descriptor; a mixing unit which generates an audio signal by mixing the main audio signal and the auxiliary audio signal based on the auxiliary information; and an audio output unit which outputs the audio signal.

27 Claims, 11 Drawing Sheets

FIG. 4

```
AD_descriptor() {
    Reserved              1111              4bits    ←- <1>~410
    AD_descriptor_length  1000              4bits
    AD_text_tag           0x4454474144      5bytes
    AD_revision_text_tag  0x31              1byte             }400
    AD_fade_byte          0xyy              1byte
    AD_pan_byte           0xyy              1byte
    Reserved              0xffffffffffffff  7bytes   ←- <2>~420
}
```

FIG. 5

| Value | Definition |
|---|---|
| 0 | Non Forced |
| 1 | Forced |

FIG. 6

| Value | Definition |
|---|---|
| 000 | Broadcast(TYPICAL) |
| 001 | Default Audio Language Setting |
| 010 | EAS |
| Others | Reserved |

FIG. 7

| Value | Definition |
|---|---|
| 0000 | English |
| 0001 | Korean |
| Others | we will define |

FIG. 11

```
AD_descriptor() {
  Reserved                1111                  4bits
  AD_descriptor_length    1000                  4bits
  AD_text_tag             0x4454474144          5bytes
  AD_revision_text_tag    0x31                  1byte
  AD_fade_byte            0xyy                  1byte
  AD_pan_byte             0xyy                  1byte
  Reserved                0xffffffffffffff      7bytes
}
```

US 9,094,577 B2

DIGITAL BROADCAST TRANSMITTER, DIGITAL BROADCAST RECEIVER, AND AUDIO DESCRIPTION DESCRIPTOR PROCESSING METHODS THEREOF

CROSS-REFERENCE TO RELATED APPLICATION(S)

This application claims priority from Korean Patent Application No. 10-2011-0138709, filed on Dec. 20, 2011 in the Korean Intellectual Property Office, the disclosure of which is incorporated herein by reference in its entirety.

BACKGROUND

1. Field

Apparatuses and methods consistent with exemplary embodiments relate to a digital broadcast transmitter, a digital broadcast receiver, and audio description descriptor processing methods thereof, and more particularly, to a digital broadcast transmitter which transmits an audio description descriptor including auxiliary information, a digital broadcast receiver which receives and processes the audio description descriptor, and audio description descriptor processing methods of the digital broadcast transmitter and the digital broadcast receiver.

2. Description of the Related Art

With the spread of digital broadcasting, an increasing number of electronic devices have been designed to provide digital broadcast services. Not only home-base devices, such as a digital television (TV), a set-top box, etc., but also mobile devices, such as a mobile phone, a navigation device, a Personal Digital Assistant (PDA), an MP3 player, etc., have been equipped with a function to support digital broadcast services.

Digital broadcasting is a type of broadcasting, which is characterized by digitally compressing a broadcast signal and transmitting the digitally-compressed broadcast signal. Digital broadcasting can allow multiple videos or audios to be compressed and transmitted without any quality degradation.

Digital broadcasting may provide audio descriptions to help, for example, the visually challenged, to better understand the content of each broadcast program. The term "audio description" may indicate an audio output of the title of a broadcast program or a narrated presentation of the content of the broadcast program. That is, an audio description may correspond to an auxiliary audio signal. For example, when a video message "Kildong Hong, the mayor of Seoul" is displayed on a screen, a corresponding audio message may be output as an audio description.

An audio description may be included in a digital broadcast program along with an audio description descriptor indicating whether the digital broadcast program includes any audio description. FIG. 11 illustrates the configuration of a related-art audio description descriptor.

Referring to FIG. 11, the related-art audio description descriptor is simply used to transmit information relating to an audio description, such as, whether to apply effects, such as "fade" and "pan," to the audio description, and may be considered inefficient because it often includes too many reserved fields that are not much of use.

Therefore, there is a need for methods to make efficient use of an audio description descriptor.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

Exemplary embodiments provide a digital broadcast transmitter which transmits an audio description descriptor including auxiliary information, a digital broadcast receiver which receives and processes the audio description descriptor, and audio description descriptor processing methods of the digital broadcast transmitter and the digital broadcast receiver.

According to an aspect of an exemplary embodiment, there is provided a digital broadcast receiver, including: a broadcast reception unit which receives a digital broadcast signal; a signal separation unit which separates a main audio signal, an auxiliary audio signal, and an audio description descriptor from the received digital broadcast signal; an extraction unit which extracts auxiliary information from the audio description descriptor; a mixing unit which composes an audio signal by mixing the main audio signal and the auxiliary audio signal based on the auxiliary information; and an audio output unit which outputs the composed audio signal.

The auxiliary information may include language information, and the digital broadcast receiver may also include a control unit which sets a default language for the digital broadcast receiver based on the language information.

The received digital broadcast signal may include a plurality of main audio signals and the auxiliary information comprises language information, and the mixing unit may mix one of the plurality of main audio signals corresponding to the language information and the auxiliary audio signal.

The received digital broadcast signal may include a plurality of main audio signals and a plurality of auxiliary audio signals and the auxiliary information may include language information. The mixing unit may mix one of the plurality of main audio signals corresponding to the language information and one of the plurality of auxiliary audio signals corresponding to the language information.

The language information may include first language information corresponding to the main audio signal or the plurality of main audio signals and second language information corresponding to the auxiliary audio signal or the plurality of auxiliary audio signals.

The received digital broadcast signal may include a plurality of main audio signals and a plurality of auxiliary audio signals and the auxiliary information may include language information. The mixing unit may mix one of the plurality of main audio signals corresponding to a default language set in the digital broadcast receiver and one of the plurality of auxiliary audio signals corresponding to the language information.

The auxiliary information may include mute information, and the mixing unit mixes the main audio signal and the auxiliary audio signal such that the auxiliary audio signal is muted during a period indicated by the mute information.

The auxiliary audio signal may include an Emergency Alert System (EAS) audio signal and the auxiliary information comprises EAS information, and the mixing unit may mix both the main audio signal and the EAS audio signal during a period indicated by the EAS information.

The auxiliary audio signal may include an EAS audio signal and the auxiliary information comprises EAS information, and the mixing unit may output only the EAS audio signal during a period indicated by the EAS information.

The auxiliary information may be recorded in a reserved field of the audio description descriptor.

According to an aspect of another exemplary embodiment, there is provided a digital broadcast transmitter, including: a signal input unit which receives a main audio signal and an auxiliary audio signal; a descriptor generation unit which generates an audio description descriptor including auxiliary information; a signal merge unit which generates a digital broadcast signal by merging the generated audio description descriptor, the main audio signal, and the auxiliary audio signal; and a broadcast transmission unit which transmits the generated digital broadcast signal.

The auxiliary information may include at least one of language information, Emergency Alert System (EAS) information, and mute information.

The descriptor generator may record the auxiliary information into a reserved field of the audio description descriptor.

According to an aspect of another exemplary embodiment, there is provided an audio description descriptor processing method of a digital broadcast receiver, the audio description descriptor processing method including: receiving a digital broadcast signal; separating a main audio signal, an auxiliary audio signal, and an audio description descriptor from the received digital broadcast signal; extracting auxiliary information from the audio description descriptor; mixing the main audio signal and the auxiliary audio signal based on the auxiliary information to compose an audio signal; and outputting the composed audio signal.

The auxiliary information may include language information, wherein the audio description descriptor processing method may also include setting a default language for the digital broadcast receiver based on the language information.

The received digital broadcast signal may include a plurality of main audio signals and the auxiliary information comprises language information, and the mixing may include mixing one of the plurality of main audio signals corresponding to the language information and the auxiliary audio signal.

The received digital broadcast signal may include a plurality of main audio signals and a plurality of auxiliary audio signals and the auxiliary information comprises language information, and the mixing may include mixing one of the plurality of main audio signals corresponding to the language information and one of the plurality of auxiliary audio signals corresponding to the language information.

The language information may include first language information corresponding to the main audio signal or the plurality of main audio signals and second language information corresponding to the auxiliary audio signal or the plurality of auxiliary audio signals.

The received digital broadcast signal may include a plurality of main audio signals and a plurality of auxiliary audio signals and the auxiliary information may include language information. The mixing may include mixing one of the plurality of main audio signals corresponding to a default language set in the digital broadcast receiver and one of the plurality of auxiliary audio signals corresponding to the language information.

The auxiliary information may include mute information, and the mixing may include mixing the main audio signal and the auxiliary audio signal such that the auxiliary audio signal is muted during a period indicated by the mute information.

The auxiliary audio signal may include an Emergency Alert System (EAS) audio signal and the auxiliary information comprises EAS information, and the mixing may include mixing both the main audio signal and the EAS audio signal during a period indicated by the EAS information.

The auxiliary audio signal may include an EAS audio signal and the auxiliary information comprises EAS information, and the mixing may include outputting only the EAS audio signal during a period indicated by the EAS information.

The auxiliary information may be recorded in a reserved field of the audio description descriptor.

According to an aspect of another exemplary embodiment, there is provided an audio description descriptor processing method of a digital broadcast transmitter, the audio description descriptor processing method including: receiving a main audio signal and an auxiliary audio signal; generating an audio description descriptor including auxiliary information; generating a digital broadcast signal by merging the generated audio description descriptor, the main audio signal, and the auxiliary audio signal; and transmitting the generated digital broadcast signal.

The auxiliary information may include at least one of language information, Emergency Alert System (EAS) information, and mute information.

The generating may include recording the auxiliary information into a reserved field of the audio description descriptor.

BRIEF DESCRIPTION OF THE DRAWINGS

The above and/or other aspects will be more apparent by describing certain exemplary embodiments with reference to the accompanying drawings, in which:

FIG. 4 is a diagram illustrating the configuration of an audio description descriptor according to an exemplary embodiment;

FIGS. 5 to 7 are diagrams showing examples of the definition of auxiliary information;

FIG. 11 is a diagram illustrating the structure of a related-art audio description descriptor.

DETAILED DESCRIPTION OF THE EXEMPLARY EMBODIMENTS

Figure 1:
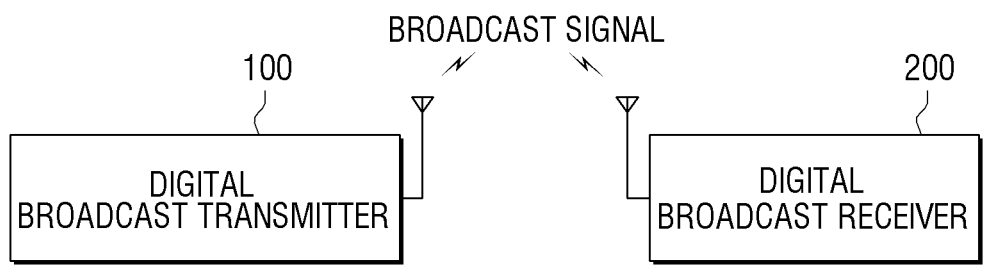
FIG. 1 is a block diagram illustrating a digital broadcasting system according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail. Herein, the term "unit" means a hardware component such as a processor or circuit, and/or a software component that is executed by a hardware component such as a processor or circuit.

FIG. 1 is a block diagram illustrating a digital broadcasting system according to an exemplary embodiment.

Referring to FIG. 1, a digital broadcasting system includes a digital broadcast transmitter 100 and a digital broadcast receiver 200.

The digital broadcast transmitter 100 may generate a digital broadcast signal and may output the digital broadcast signal. For example, the digital broadcast transmitter 100 may generate a digital broadcast signal including a main audio signal, an auxiliary audio signal (e.g., an audio description) and an audio description descriptor having auxiliary information, and may output the generated digital broadcast signal. The structure and operation of the digital broadcast transmitter 100 are further described with reference to FIG. 2.

The digital broadcast receiver 200 may receive a digital broadcast signal, may separate a main audio signal, an auxiliary audio signal, and an audio description descriptor from the received digital broadcast signal, may extract auxiliary information from the audio description descriptor, may compose an audio signal by mixing the main audio signal and the auxiliary audio signal based on the auxiliary information, and may output the composed audio signal. The structure and operation of the digital broadcast receiver 200 are further described with reference to FIG. 3.

In the exemplary embodiment illustrated in FIG. 1, a digital broadcast signal may be directly transmitted between the digital broadcast transmitter 100 and the digital broadcast receiver 200. Alternatively, a relay device may be provided between the digital broadcast transmitter 100 and the digital broadcast receiver 200, and a digital broadcast signal may be transmitted between the digital broadcast transmitter 100 and the digital broadcast receiver via the relay device. In the exemplary embodiment illustrated in FIG. 1, a digital broadcast signal may be wirelessly transmitted between the digital broadcast transmitter 100 and the digital broadcast receiver 200. Alternatively, a digital broadcast signal may be transmitted between the digital broadcast transmitter 100 and the digital broadcast receiver 200 by wired means.

Figure 2:
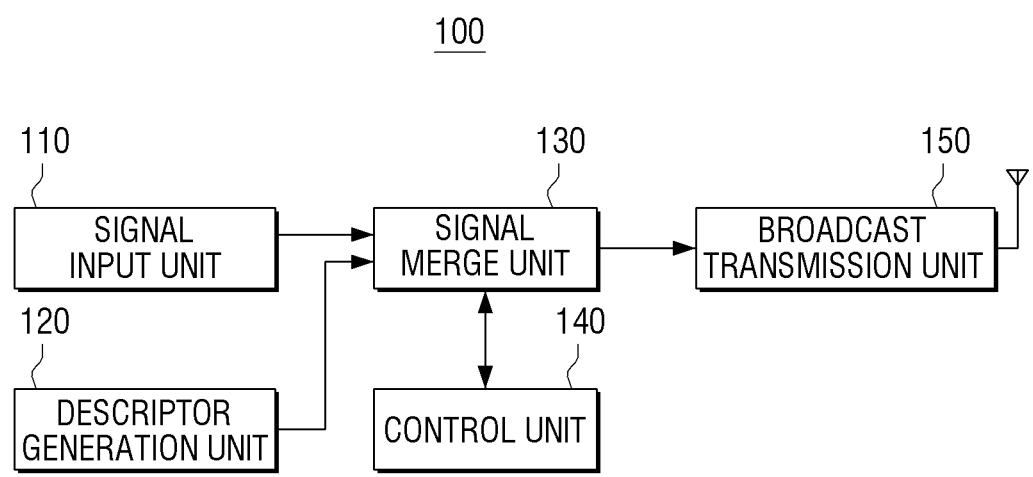
FIG. 2 is a block diagram illustrating a digital broadcast transmitter illustrated in FIG. 1, according to an exemplary embodiment.

FIG. 2 is a block diagram illustrating an example of the digital broadcast transmitter 100.

Referring to FIG. 2, the digital broadcast receiver 100 includes a signal input unit 110, a descriptor generation unit 120, a signal merge unit 130, a control unit 140, and a broadcast transmission unit 150.

The signal input unit 110 may receive an input main audio signal and an input auxiliary audio signal. For example, the signal input unit 110 may receive one or more main audio signals and one or more auxiliary audio signals from an external device. The input auxiliary audio signal may be an audio description or an Emergency Alert System (EAS) audio signal, which is an emergency alert message.

The descriptor generation unit 120 may generate an audio description descriptor including auxiliary information. For example, the descriptor generation unit 120 may add auxiliary information to a reserved field of an audio description descriptor corresponding to the input auxiliary audio signal, thereby generating an audio description descriptor including the auxiliary information. The auxiliary information may include language information, EAS information, and mute information. The auxiliary information is further described with reference to FIG. 3.

The signal merge unit 130 may generate a digital broadcast signal by merging the audio description descriptor generated by the descriptor generation unit 120, the input main audio signal, and the input auxiliary audio signal. The signal merge unit 130 may output the generated digital broadcast signal.

The control unit 140 may control the signal input unit 110, the descriptor generation unit 120, the signal merge unit 130, and the broadcast transmission unit 150. More specifically, in response to the receipt of the input auxiliary audio signal from the signal input unit 110, the control unit 140 may control the descriptor generation unit 120 to insert the auxiliary information into the audio description descriptor corresponding to the input auxiliary audio signal, and may control the signal merge unit 130 and the broadcast transmission unit 150 to generate a digital broadcast signal including the auxiliary information and output the generated digital broadcast signal.

According to the exemplary embodiment illustrated in FIG. 2, the digital broadcast transmitter 100 may insert auxiliary information into one or more fields of an audio description descriptor that are conventionally not much of use, and may thus improve the efficiency of the use of an audio description descriptor.

In the exemplary embodiment illustrated in FIG. 2, the digital broadcast transmitter 100 may transmit an audio signal. Alternatively, the digital broadcast transmitter 100 may generate a digital broadcast signal including a video signal and an audio signal, and may output the generated digital broadcast signal.

In the exemplary embodiment illustrated in FIG. 2, the digital broadcast transmitter 100 may merge a main audio signal and an auxiliary audio signal into a single digital broadcast signal. Alternatively, the digital broadcast transmitter 100 may generate two separate digital broadcast signals (for example, transport streams (TS)) based on a main audio signal and an auxiliary audio signal. In a case in which a plurality of main audio signals are provided, the digital broadcast transmitter 100 may transmit the main audio signals as separate digital broadcast signals. Similarly, in a case in which a plurality of auxiliary audio signals are provided, the digital broadcast transmitter 100 may transmit the auxiliary audio signals as separate digital broadcast signals.

Figure 3:
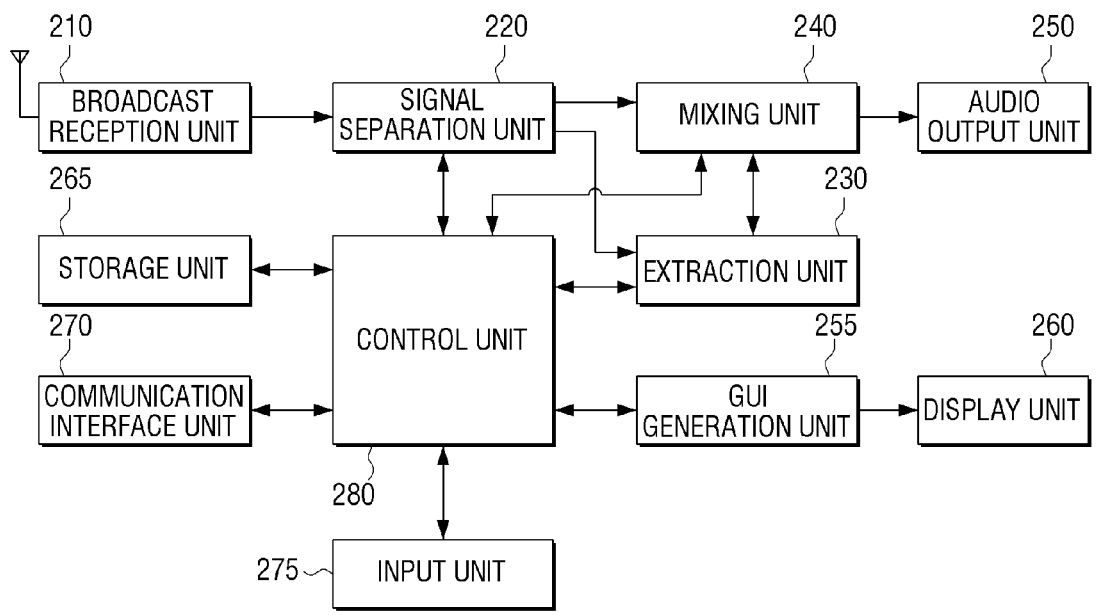
FIG. 3 is a block diagram illustrating a digital broadcast receiver illustrated in FIG. 1, according to an exemplary embodiment.

FIG. 3 is a block diagram illustrating an example of the digital broadcast receiver 200.

Referring to FIG. 3, the digital broadcast receiver 200 includes a broadcast reception unit 210, a signal separation unit 220, an extraction unit 230, a mixing unit 240, an audio output unit 250, a Graphic User Interface (GUI) generation unit 255, a display unit 260, a storage unit 265, a communication interface unit 270, an input unit 275, and a control unit 280. For example, the digital broadcast receiver 200 may be implemented as a set-top box, a digital TV, a digital versatile disc (DVD) player, or the like.

The broadcast reception unit 210 may receive a digital broadcast signal from a broadcasting station, a satellite, or the like either wirelessly or by wired means, and may demodulate the received digital broadcast signal. The received digital broadcast signal may be a digital broadcast signal including an audio signal only or a digital broadcast signal including both a video signal and an audio signal.

The signal separation unit 220 may separate a main audio signal, an auxiliary audio signal, and an audio description descriptor from the received digital broadcast signal. The signal separation unit 220 may transmit the separated main audio signal and the separated auxiliary audio signal to the mixing unit 240, and may transmit the separated audio description descriptor to the extraction unit 230. For example, in a case in which the received digital broadcast signal includes a plurality of main audio signals and a plurality of auxiliary audio signals, the signal separation unit 220 may separate the plurality of main audio signals and the plurality of auxiliary audio signals from the received digital broadcast signal. In this example, the plurality of main audio signals may be audio signals of different languages, and the plurality of auxiliary audio signals may be audio descriptions of different languages. In the exemplary embodiment illustrated in FIG. 3, a main audio signal, an auxiliary audio signal, and an audio description descriptor may be obtained from a single digital broadcast signal. Alternatively, in a case in which a main audio signal and an auxiliary audio signal are provided as separate digital broadcast signals, the main audio signal and the auxiliary audio signal may be extracted from separate digital broadcast signals individually.

In a case in which the received digital broadcast signal includes a video signal, the signal separation unit 220 may also separate the video signal from the received digital broadcast signal.

The extraction unit 230 may extract auxiliary information from the separated audio description descriptor. For example, the extraction unit 230 may extract the auxiliary information from a reserved field of the separated audio description descriptor. The auxiliary information may include language information, EAS information and mute information.

The mixing unit 240 may perform signal processing, such as, audio decoding or the like, on audio signals provided by the broadcast reception unit 210 and the storage unit 265.

The mixing unit 240 may mix audio signals based on the extracted auxiliary information. More specifically, the mixing unit 240 may mix a main audio signal and an auxiliary audio signal based on the extracted auxiliary information. For example, if the extracted auxiliary information includes language information and the received digital broadcast signal includes a plurality of main audio signals and an auxiliary audio signal, the mixing unit 240 may mix a main audio signal corresponding to the language information with the auxiliary audio signal.

In a case in which the received digital broadcast signal includes a plurality of language audio signals, the digital broadcast receiver 200 may select a language audio signal to be automatically output from among the plurality of language audio signals based on language information included in the extracted auxiliary information.

In a case in which the extracted auxiliary information includes first language information and second language information and the received digital broadcast signal includes a plurality of main audio signals and a plurality of auxiliary audio signals, the mixing unit 240 may mix a main audio signal corresponding to the first language information and an auxiliary audio signal corresponding to the second language information. Alternatively, the mixing unit 240 may select a main audio signal and an auxiliary audio signal corresponding to a default language set in the digital broadcast receiver 200 from among the plurality of main audio signals and the plurality of auxiliary audio signals, and may mix the selected main audio signal and the selected auxiliary audio signal.

That is, in a case in which the received digital broadcast signal includes a plurality of audio signals of different languages, the digital broadcast receiver 200 may select an audio signal to be automatically output from among the plurality of audio signals based on language information included in the extracted auxiliary information. For example, if the default language set in the digital broadcast receiver 200 is English and the language information included in the extracted auxiliary information corresponds to Spanish, a main audio signal may be output in English, and an auxiliary audio signal may be output in Spanish.

In a case in which the received digital broadcast signal includes a plurality of audio signals of different languages, the digital broadcast receiver 200 may select a main audio signal and an auxiliary audio signal to be automatically output from among the plurality of audio signals based on the language information included in the extracted auxiliary information. In a case in which the extracted auxiliary information includes a plurality of pieces of language information, the digital broadcast receiver 200 may select audio signals of different languages as a main audio signal and an auxiliary audio signal. For example, a main audio signal may be output in English, and an auxiliary audio signal (i.e., an audio description) may be output in Spanish.

In a case in which the extracted auxiliary information includes mute information, the mixing unit 240 may mix a main audio signal and an auxiliary audio signal such that the auxiliary audio signal may be muted during a time period indicated by the mute information, i.e., only the main audio signal may be output during the time period indicated by the mute information.

For example, in a case in which an audio description contains any undesirable audio data (such as profane language and/or sexual references), the digital broadcast receiver 200 may control the undesirable audio data not to be output temporarily based on the mute information included in the extracted auxiliary information.

In a case in which the extracted auxiliary information is EAS information and the received digital broadcast signal includes an EAS audio signal as an auxiliary audio signal, the mixing unit 240 may mix a main audio signal and the EAS audio signal. For example, the mixing unit 240 may mix the main audio signal and the EAS audio signal such that the main audio signal may be muted, i.e., only the EAS audio signal may be output.

Accordingly, in an environment where EAS information is provided via a particular channel, the digital broadcast receiver 200 may provide the EAS information to a user without the need to switch to the particular channel, and thus, there is no need for the digital broadcast receiver 200 to stop any current operation (for example, recording). In addition, in an environment where EAS information is provided via a smart card, the digital broadcast receiver 200 may also provide the EAS information to the user without a requirement of a smart card.

The mixing unit 240 may transmit a mixed audio signal to the audio output unit 250.

In a case in which received video and audio signals are stored in the storage unit 265, the mixing unit may output a mixed audio signal to the storage unit 265.

The audio output unit 250 may convert an audio signal output by the mixing unit 240 into sound data. The audio output unit 250 may output the sound data via a speaker (not illustrated) or may output the sound data to an external device (not illustrated) connected to the digital broadcast receiver 200 via an external output port (not illustrated).

The GUI generation unit 255 may generate a GUI to be provided to a user. The GUI generation unit 255 may add the GUI to an image output by the mixing unit 240. The GUI generation unit 255 may provide the image with the GUI added thereto to the display unit 260.

The display unit 260 may display various information provided by the digital broadcast receiver 200 and an image provided by the GUI generation unit 255.

The storage unit 265 may store audio content. More specifically, the storage unit 265 may be provided with audio content by the mixing unit 240, and may store the audio content. The storage unit 265 may output audio content stored therein to the mixing unit 240 under the control of the control unit 280. For example, the storage unit 265 may be implemented as a hard disk, a nonvolatile memory, a volatile memory, or the like.

The communication interface unit 270 may connect the digital broadcast receiver 200 to an external device (not illustrated). For example, the communication interface unit 270 may connect the digital broadcast receiver 200 to the external device via a Local Area Network (LAN) or the Internet or via a Universal Serial Bus (USB) port.

The input unit 275 may receive settings or selections regarding various functions provided by the digital broadcast receiver 200.

The control unit 280 may control the general operation of the digital broadcast receiver 200. If the extracted auxiliary information includes language information, the control unit 280 may set a default language for the digital broadcast receiver 200 based on the language information. For example, if the extracted auxiliary information includes language information corresponding to Korean, the control unit 280 may set Korean as the default language for the digital broadcast receiver 200. The control unit 280 may be a hardware processor or the like.

The digital broadcast receiver 200 may provide convenience to a user by using auxiliary information included in an audio description descriptor. More specifically, the digital broadcast receiver 200 may allow its default language to be automatically set, and may also allow a language for a main audio signal and an audio description to be automatically set. In addition, the digital broadcast receiver 200 may automatically block an audio description that is inappropriate for, for example, minors, and may provide an EAS service without requiring channel switching.

The digital broadcast receiver 200 is illustrated in FIG. 3 as processing audio signals only. However, the digital broadcast receiver 200 may process digital broadcast signals including both video signals and audio signals.

FIG. 4 is a diagram illustrating an example of the configuration of an audio description descriptor.

Figure 5:
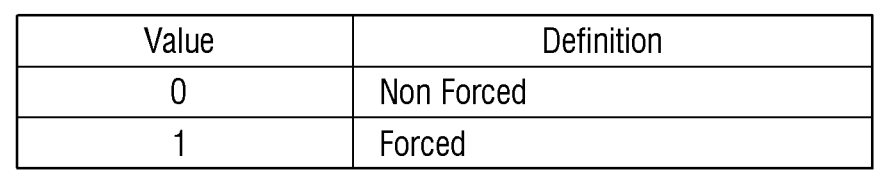

Referring to FIG. 4, an audio description descriptor AD_descriptor includes reserved fields 410 and 420, and auxiliary information may be included in each of the reserved fields 410 and 420. More specifically, referring to FIG. 5, an upper bit of the reserved field 410 may include information indicating whether the audio description descriptor AD_descriptor includes auxiliary information. Referring to FIG. 6, the three lower bits of the reserved field 410 may include information indicating the type of auxiliary information included in the audio description descriptor AD_descriptor. Six bytes of the reserved field 420 may include user identification. The definitions of the reserved fields 410 and 420, as shown in FIGS. 5 to 7, are merely exemplary, and may thus vary.

Figure 8:
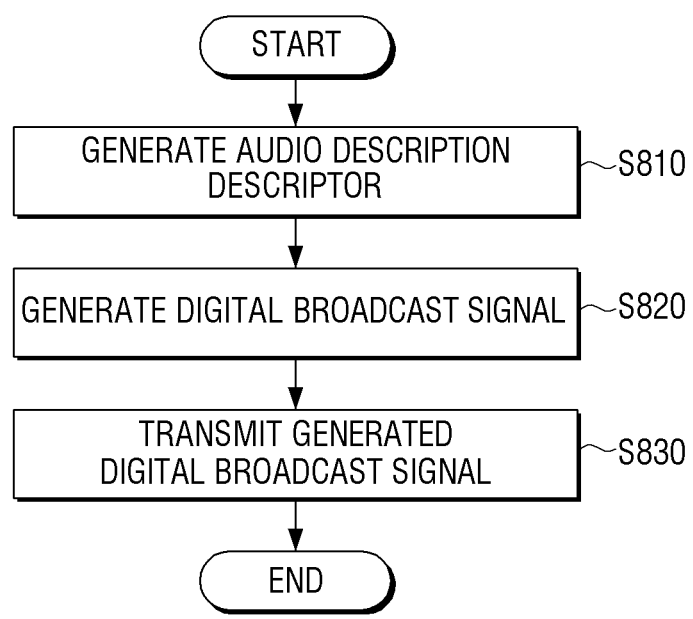
FIG. 8 is a flowchart illustrating an audio description descriptor processing method of a digital broadcast transmitter, according to an exemplary embodiment.

FIG. 8 is a flowchart illustrating an audio description descriptor processing method of a digital broadcast transmitter, according to an exemplary embodiment.

Referring to FIG. 8, in operation S810, an input main audio signal and an input auxiliary audio signal may be received, and an audio description descriptor including auxiliary information may be generated. More specifically, the audio description descriptor including the auxiliary information may be generated by adding the auxiliary information to a reserved field of an audio description descriptor corresponding to the input auxiliary audio signal. For example, the auxiliary information may include language information, EAS information, and mute information.

In operation S820, a digital broadcast signal may be generated by merging the audio description descriptor including the auxiliary information, the input main audio signal, and the input auxiliary audio signal. In operation S830, the digital broadcast signal may be output.

According to the exemplary embodiment illustrated in FIG. 8, auxiliary information may be inserted into one or more fields of an audio description descriptor that are conventionally not of much use, and thus, the efficiency of the use of an audio description descriptor may be improved. The exemplary embodiment illustrated in FIG. 8 may be performed by a digital broadcast transmitter, for example, having the structure illustrated in FIG. 2 or another structure.

Figure 9:
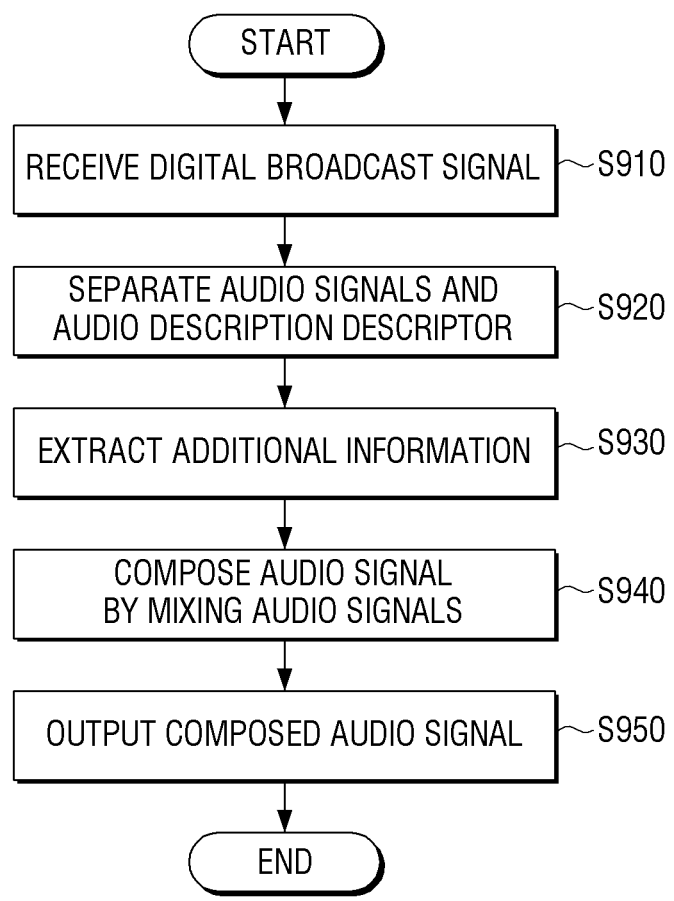
FIG. 9 is a flowchart illustrating an audio description descriptor processing method of a digital broadcast receiver, according to an exemplary embodiment.

FIG. 9 is a flowchart illustrating an audio description descriptor processing method of a digital broadcast receiver, according to an exemplary embodiment.

Referring to FIG. 9, in operation S910, a digital broadcast signal may be received.

In operation S920, a main audio signal, an auxiliary audio signal, and an audio description descriptor may be separated from the received digital broadcast signal. In a case in which the received digital broadcast signal includes a plurality of main audio signals and a plurality of auxiliary audio signals, the plurality of main audio signals and the plurality of auxiliary audio signals may be separated individually from the received broadcast signal. In this case, the plurality of main audio signals may be audio signals of different languages, and the plurality of auxiliary audio signals may be audio descriptions of different languages.

In operation S930, auxiliary information may be extracted from the audio description descriptor. More specifically, the auxiliary information may be extracted from a reserved field of the audio description descriptor. For example, the auxiliary information may include language information, EAS information, and mute information.

In operation S940, an audio signal may be composed by mixing the main audio signal and the auxiliary audio signal which may be mixed based on the auxiliary information extracted from the audio description descriptor. For example, if the auxiliary information is language information and the received digital broadcast signal includes a plurality of main audio signals and an auxiliary audio signal, a main audio signal corresponding to the language information may be selected from among the plurality of main audio signals, and the selected main audio signal may be mixed with the auxiliary audio signal. If the auxiliary information includes first language information and second language information and the received broadcast signal includes a plurality of main audio signals and a plurality of auxiliary audio signals, one of the plurality of main audio signals corresponding to the first language information and one of the plurality of auxiliary audio signals corresponding to the second language information may be mixed.

Alternatively, if the auxiliary information includes mute information and the received broadcast signal includes a main audio signal and an auxiliary audio signal, the main audio signal and the auxiliary audio signal may be mixed such that the auxiliary audio signal may be muted during a period indicated by the mute information, i.e., that only the main audio signal may be output during the period indicated by the mute information.

Alternatively, if the auxiliary information includes EAS information and the received digital broadcast signal includes a main signal and includes an EAS audio signal as an auxiliary audio signal, the main audio signal and the EAS audio signal may be mixed, or the main audio signal and the EAS audio signal may be mixed such that the main audio signal is not input output during the period indicated by the EAS information, i.e., only the EAS audio signal may be output during the period indicated by the EAS information.

In operation S950, the composed audio signal may be output. For example, the composed audio signal may be converted into sound data, and the sound data may be output via a speaker (not illustrated). Alternatively, the composed audio signal may be output to an external device (not illustrated) via an external output port (not illustrated).

Figure 10:
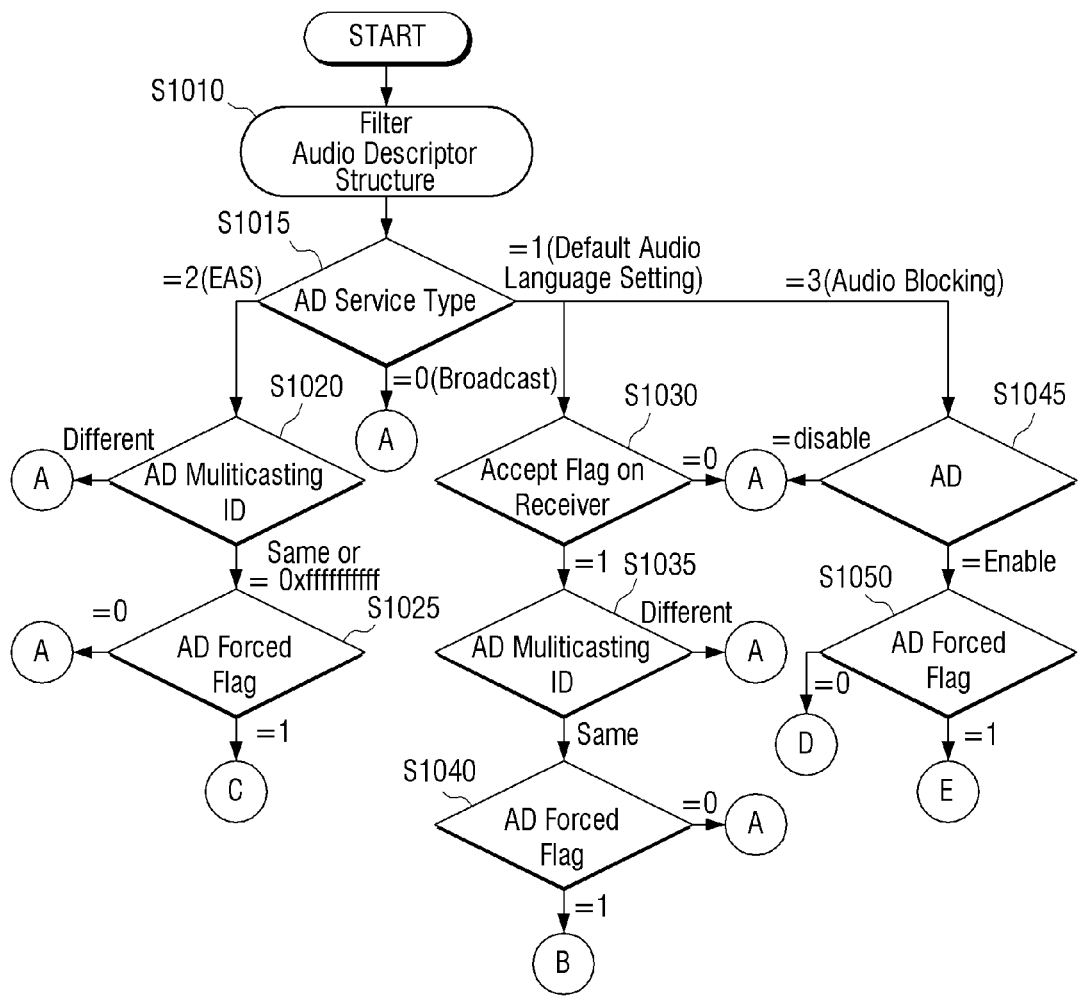
FIG. 10 is a detailed flowchart illustrating an example of the audio description descriptor processing method illustrated in FIG. 9.

FIG. 10 is a detailed flowchart illustrating an example of the audio description descriptor processing method illustrated in FIG. 9.

Referring to FIG. 10, in operation S1010, an audio description descriptor may be extracted from a digital broadcast signal.

In operation S1015, an auxiliary information type may be determined based on a reserved field of the extracted audio description descriptor.

In operations S1020 and S1025, if the extracted audio description descriptor is determined to include EAS information as auxiliary information, an audio description multicasting identifier (ID) and an audio description forced flag of the digital broadcast receiver may be identified, i.e., a verification may be made as to whether the auxiliary information is EAS information. If the auxiliary information is verified as EAS information, an EAS service may be provided to a user.

Alternatively, in operations S1030, S1035, and S1040, if the auxiliary information is determined to be language information, an accept flag, the audio description multicasting ID and the audio description forced flag of the digital broadcast receiver may be identified, i.e., a verification may be made as to whether the auxiliary information is language information. If the auxiliary information is verified as language information, default language information may be set for the digital broadcast receiver based on the language information.

Alternatively, in operations S1045 and S1050, if the auxiliary information is determined to be mute information, a process may be performed to verify whether the auxiliary information is mute information. If the auxiliary information is verified as mute information, a predetermined audio description may be temporarily muted based on the mute information.

According to the exemplary embodiments illustrated in FIGS. 9 and 10, it is possible to provide convenience to a user by using auxiliary information included in an audio description descriptor. For example, a default language may be automatically set for a digital broadcast receiver, and a language in which to output a main audio signal and an audio description may be automatically set. In addition, an audio description that is inappropriate for, for example, minors, may be automatically blocked, and an EAS service may be provided without requiring channel switching. The exemplary embodiments illustrated in FIGS. 9 and 10 may be performed by a digital broadcast receiver, for example, having the structure illustrated in FIG. 3 or another structure.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A digital broadcast receiver comprising:
a broadcast reception unit which receives a digital broadcast signal;
a signal separation unit which separates a main audio signal, an auxiliary audio signal comprising an audio description for providing an audio message related to visually displayed content of a broadcast program or an Emergency Alert System (EAS) audio signal, and an audio description descriptor indicating whether the broadcast program includes the audio description or the EAS audio signal from the received digital broadcast signal;
an extraction unit which extracts auxiliary information from the audio description descriptor;
a mixing unit which generates an audio signal by mixing the main audio signal and the auxiliary audio signal based on the auxiliary information; and
an audio output unit which outputs the audio signal.

2. The digital broadcast receiver of claim 1, wherein the auxiliary information comprises language information, and wherein the digital broadcast receiver further comprises a control unit which sets a default language for the digital broadcast receiver based on the language information extracted from the auxiliary information.

3. The digital broadcast receiver of claim 1, wherein the received digital broadcast signal comprises a plurality of main audio signals corresponding to different languages, and the auxiliary information comprises language information, wherein the mixing unit mixes one of the plurality of main audio signals having a language that corresponds to the language information and the auxiliary audio signal.

4. The digital broadcast receiver of claim 1, wherein the received digital broadcast signal comprises a plurality of main audio signals and a plurality of auxiliary audio signals, and the auxiliary information comprises language information, wherein the mixing unit mixes one of the plurality of main audio signals corresponding to the language information and one of the plurality of auxiliary audio signals corresponding to the language information.

5. The digital broadcast receiver of claim 4, wherein the language information comprises first language information and second language information, and the mixing unit mixes the one of the plurality of main audio signals having a first language corresponding to the first language information and the one of the plurality of auxiliary audio signals having a second language corresponding to the second language information.

6. The digital broadcast receiver of claim 1, wherein the received digital broadcast signal comprises a plurality of main audio signals and a plurality of auxiliary audio signals, and the auxiliary information comprises language information, wherein the mixing unit mixes one of the plurality of main audio signals corresponding to a default language set in the digital broadcast receiver and one of the plurality of auxiliary audio signals which has a language corresponding to the language information.

7. The digital broadcast receiver of claim 1, wherein the auxiliary information comprises mute information, wherein the mixing unit mixes the main audio signal and the auxiliary audio signal such that the auxiliary audio signal is muted during a period indicated by the mute information.

8. The digital broadcast receiver of claim 1, wherein the auxiliary audio signal comprises the EAS audio signal and the auxiliary information comprises EAS information, wherein the mixing unit mixes both the main audio signal and the EAS audio signal during a period indicated by the EAS information.

9. The digital broadcast receiver of claim 1, wherein the auxiliary audio signal comprises the EAS audio signal and the auxiliary information comprises EAS information, wherein the mixing unit outputs only the EAS audio signal among the main audio signal and the EAS audio signal during a period indicated by the EAS information.

10. The digital broadcast receiver of claim 1, wherein the auxiliary information is recorded in a reserved field of the audio description descriptor.

11. The digital broadcast receiver of claim 1, wherein the received digital broadcast signal comprises a plurality of main audio signals, each of which correspond to one of a plurality of different languages, and a plurality of auxiliary audio signals, each of which correspond to one of the plurality of different languages, and the mixing unit selects the one of the plurality of main audio signals having a language that corresponds to the language information and the one of the plurality of auxiliary audio signals having the language that corresponds to the language information.

12. A digital broadcast transmitter comprising:
a signal input unit which receives a main audio signal and an auxiliary audio signal;
a descriptor generation unit which generates an audio description descriptor including auxiliary information;
a signal merge unit which generates a digital broadcast signal by merging the generated audio description descriptor, the main audio signal, and the auxiliary audio signal; and
a broadcast transmission unit which transmits the generated digital broadcast signal,
wherein the auxiliary audio signal comprises an audio description for providing an audio message related to visually displayed content of a broadcast program or an Emergency Alert System (EAS) audio signal, and
wherein the audio description descriptor indicates whether the broadcast program includes the audio description or the EAS audio signal.

13. The digital broadcast transmitter of claim 12, wherein the auxiliary information comprises at least one of language information, EAS information, and mute information.

14. The digital broadcast transmitter of claim 12, wherein the descriptor generator records the auxiliary information into a reserved field of the audio description descriptor.

15. The audio description descriptor processing method of claim 1, wherein the auxiliary information comprises language information, and
wherein the audio description descriptor processing method further comprises setting a default language for the digital broadcast receiver based on the language information extracted from the auxiliary information.

16. An audio description descriptor processing method of a digital broadcast receiver, the audio description descriptor processing method comprising:
receiving a digital broadcast signal;
separating a main audio signal, an auxiliary audio signal comprising an audio description for providing an audio message related to visually displayed content of a broadcast program or an Emergency Alert System (EAS) audio signal, and an audio description descriptor indicating whether the broadcast program includes the audio description or the EAS audio signal from the received digital broadcast signal;
extracting auxiliary information from the audio description descriptor;
generating an audio signal by mixing the main audio signal and the auxiliary audio signal based on the auxiliary information; and
outputting the generated audio signal.

17. The audio description descriptor processing method of claim 16, wherein the received digital broadcast signal comprises a plurality of main audio signals, and the auxiliary information comprises language information, wherein the mixing comprises mixing one of the plurality of main audio signals having a language that corresponds to the language information and the auxiliary audio signal.

18. The audio description descriptor processing method of claim 16, wherein the received digital broadcast signal comprises a plurality of main audio signals and a plurality of auxiliary audio signals and the auxiliary information comprises language information, wherein the mixing comprises mixing one of the plurality of main audio signals corresponding to the language information and one of the plurality of auxiliary audio signals corresponding to the language information.

19. The audio description descriptor processing method of claim 18, wherein the language information comprises first language information and second language information, and the mixing comprises mixing the one of the plurality of main audio signals having a first language corresponding to the first language information and the one of the plurality of auxiliary audio signals having a second language corresponding to the second language information.

20. The audio description descriptor processing method of claim 16, wherein the received digital broadcast signal comprises a plurality of main audio signals and a plurality of auxiliary audio signals, and the auxiliary information comprises language information, wherein the mixing comprises mixing one of the plurality of main audio signals corresponding to a default language set in the digital broadcast receiver and one of the plurality of auxiliary audio signals which has a language corresponding to the language information.

21. The audio description descriptor processing method of claim 16, wherein the auxiliary information comprises mute information, wherein the mixing comprises mixing the main audio signal and the auxiliary audio signal such that the auxiliary audio signal is muted during a period indicated by the mute information.

22. The audio description descriptor processing method of claim 16, wherein the auxiliary audio signal comprises the EAS audio signal and the auxiliary information comprises EAS information, wherein the mixing comprises mixing both the main audio signal and the EAS audio signal during a period indicated by the EAS information.

23. The audio description descriptor processing method of claim 16, wherein the auxiliary audio signal comprises the EAS audio signal and the auxiliary information comprises EAS information, wherein the mixing comprises outputting only the EAS audio signal among the main audio signal and the EAS audio signal during a period indicated by the EAS information.

24. The audio description descriptor processing method of claim 16, wherein the auxiliary information is recorded in a reserved field of the audio description descriptor.

25. An audio description descriptor processing method of a digital broadcast transmitter, the audio description descriptor processing method comprising:
receiving a main audio signal and an auxiliary audio signal;
generating an audio description descriptor which includes auxiliary information;
generating a digital broadcast signal by merging the generated audio description descriptor, the main audio signal, and the auxiliary audio signal; and
transmitting the generated digital broadcast signal,
wherein the auxiliary audio signal comprises an audio description for providing an audio message related to visually displayed content of a broadcast program or an Emergency Alert System (EAS) audio signal, and
wherein the audio description descriptor indicates whether the broadcast program includes the audio description or the EAS audio signal.

26. The audio description descriptor processing method of claim 25, wherein the auxiliary information comprises at least one of language information, EAS information, and mute information.

27. The audio description descriptor processing method of claim 25, wherein the generating comprises recording the auxiliary information into a reserved field of the audio description descriptor.

* * * * *